United States Patent
Cheung

(10) Patent No.: US 6,865,283 B1
(45) Date of Patent: Mar. 8, 2005

(54) COMMUNICATING INFORMATION FROM AN IMAGING DEVICE TO A PROCESSOR-BASED SYSTEM

(75) Inventor: Chi M. Cheung, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 09/628,759

(22) Filed: Jul. 31, 2000

(51) Int. Cl.$^7$ .............................. G06K 9/00; H04N 7/18
(52) U.S. Cl. ...................... 382/107; 348/154; 348/155; 340/552; 340/545.3
(58) Field of Search ................................ 382/107, 236; 348/152–155, 700, 159, 208.14, 209.16; 340/541, 545.1, 545.2, 552–557, 545.3

(56) References Cited

U.S. PATENT DOCUMENTS

| | | | |
|---|---|---|---|
| 5,579,058 A | * | 11/1996 | Lee ............................ 348/699 |
| 5,671,009 A | * | 9/1997 | Chun ......................... 348/153 |
| 5,850,180 A | * | 12/1998 | Hess .......................... 340/541 |
| 5,998,780 A | * | 12/1999 | Kramer ....................... 250/221 |
| 6,005,613 A | * | 12/1999 | Endsley et al. ............ 348/231.6 |
| 6,091,777 A | * | 7/2000 | Guetz et al. ............ 375/240.11 |
| 6,125,455 A | * | 9/2000 | Yeo ............................. 714/14 |
| 6,166,729 A | * | 12/2000 | Acosta et al. ............... 345/719 |
| 6,269,484 B1 | * | 7/2001 | Simsic et al. ............... 725/151 |
| 6,323,897 B1 | * | 11/2001 | Kogane et al. ............. 348/159 |
| 6,476,858 B1 | * | 11/2002 | Ramirez Diaz et al. .... 348/159 |
| 6,532,232 B1 | * | 3/2003 | Goodwin, III ............. 370/389 |
| 6,542,078 B2 | * | 4/2003 | Script et al. ............. 340/545.1 |
| 6,570,496 B2 | * | 5/2003 | Britton ....................... 340/506 |

* cited by examiner

Primary Examiner—Bhavesh M. Mehta
Assistant Examiner—Aaron Carter
(74) Attorney, Agent, or Firm—Trop, Pruner & Hu, P.C.

(57) ABSTRACT

Image data from a capture device may be streamed from the capture device to a processor-based system. A motion detector associated with the capture device may provide a bit that is incorporated into the image data stream in place of image data, in one embodiment of the present invention. This bit may be decoded in a processor-based system to control how the image data stream, received from the capture device, is handled.

22 Claims, 3 Drawing Sheets

COMMUNICATING INFORMATION FROM AN IMAGING DEVICE TO A PROCESSOR-BASED SYSTEM

BACKGROUND

This invention relates generally to processor-based imaging devices such as digital cameras.

Digital cameras may be tethered to processor-based systems. In one example, the tether may be a cable in accordance with the Universal Serial Bus (USB) standard. Video frames captured in the digital camera may be provided over the bus to the processor-based system. In the processor-based system, the frames may be stored or otherwise manipulated or analyzed.

A number of motion detection systems are utilized with processor-based systems. Motion detection systems may be utilized to control video capture devices for surveillance purposes as one example. As another example, video cameras may be controlled in response to motion to transmit video for incorporation into web sites through so-called "web cams".

Generally, motion detection systems for digital still or video cameras utilize a motion detector that may be an infrared sensor. The operation of the camera may be controlled by the detection of motion to avoid unnecessarily capturing video when no action is occurring. However, there is a continuing need for a better way to control the operation of digital cameras that have motion detection.

DETAILED DESCRIPTION

Figure 1:
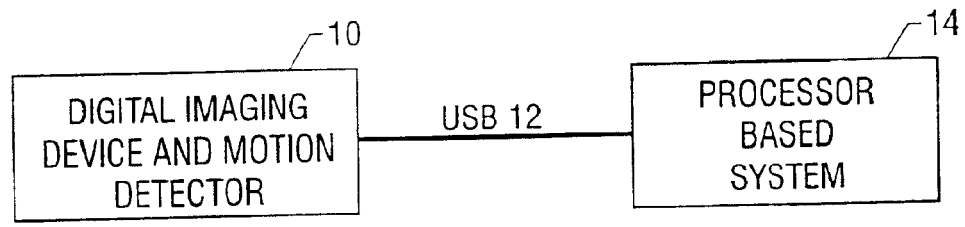
FIG. 1 is a schematic depiction of one embodiment of the present invention.

Referring to FIG. 1, a digital imaging device and motion detector 10 may be coupled by a bus 12 to a processor-based system 14. The processor-based system 14 may be a desktop computer, a laptop computer, an appliance, a handheld device or a processor-based telephone. The bus 12 may be compliant with the Universal Serial Bus specification. See Universal Serial Bus Revision 2.0 specification dated Apr. 27, 2000 available from USB Developers, Portland, Oreg. 97221.

The digital imaging device and motion detector 10 may include a digital still or video camera or scanner as two examples. The digital imaging device and motion detector 10 includes a motion detector such as an infrared motion detector. The motion detector may be integral with or separate from the imaging device.

The digital imaging device and motion detector 10 captures a depiction of a captured image including a plurality of pixels that make up a digital frame. A plurality of frames of video may be captured and transmitted over the bus 12 to the processor-based system 14.

Information about whether or not motion was detected may be added to the video stream that is transmitted between the imaging device and motion detector 10 and the processor-based system 14. In one embodiment of the present invention, streaming video may be forwarded over the bus 12 in the form of a series of packetized frames. Each frame may be formed of a plurality of digital packets. The packets may include information about the particular colors and intensities captured for one or more pixels by the imaging device and motion detector 10.

A packet header, for example, may include information about the captured intensity of one or more pixels and color information. The brightness information may include a plurality of bits including a most significant bit and a least significant bit. Information about whether or not motion was detected may be provided within a given packet in place of the least significant bit of brightness information, in one embodiment. In other cases, other bits of video data may be replaced with information about whether or not motion was detected. In still other cases, the video stream may accommodate an additional bit representing the motion information.

The motion bit may be provided with each frame or may be provided with a plurality of pixels making up a particular frame. As another example, the motion bit may be provided as the least significant bit in the brightness data for one particular pixel of each frame. That is, the data associated with the same pixel in each frame is modified to include the motion bit.

Figure 2:
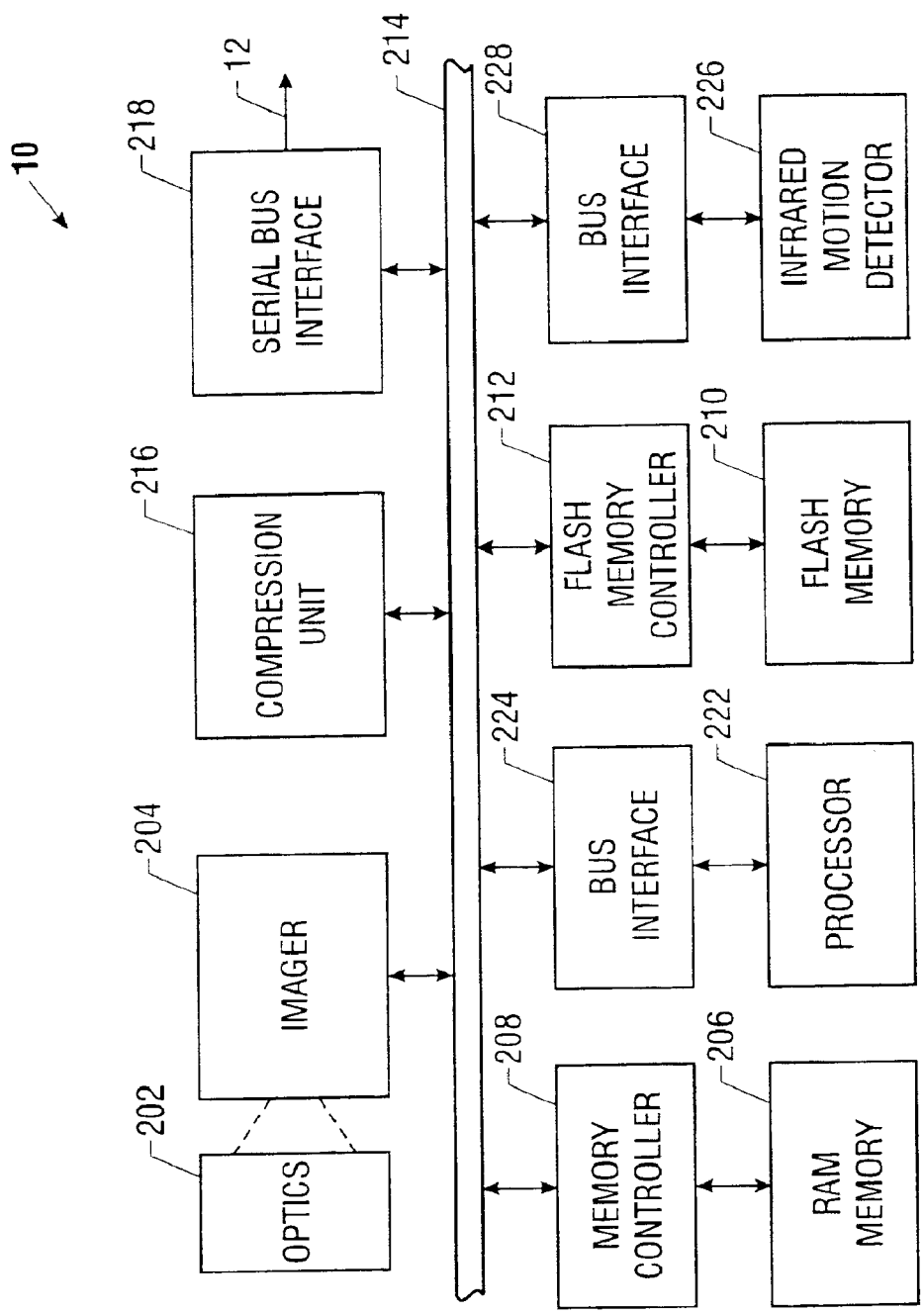
FIG. 2 is a block diagram of a video capture device in accordance with one embodiment of the present invention.

Referring to FIG. 2, the digital imaging device and motion detector 10, in accordance with one embodiment of the present invention, may include an optics unit 202 coupled to a digital imaging array or imager 204. The imager 204 is coupled to a bus 214. The optics unit 202 focuses an optical image onto the focal plane of the imager 204. The image data (e.g., frames) generated by the imager 204 may be transferred to a random access memory (RAM) 206 (through memory controller 208) or flash memory 210 (through memory controller 212) via the bus 214. In one embodiment of the present invention, the RAM 206 is a non-volatile memory.

The imaging device and motion detector 10 may also include a compression unit 216 that interacts with the imager 204 to compress the size of a generated frame before storing it in a camera memory (RAM 206 and/or flash memory 210). To transfer a frame of data to the processor-based system 14, the digital imaging device and motion detector 10 may include a serial bus interface 218 to couple the memory (RAM 206 and flash memory 210) to a serial bus 12. One illustrative serial bus is the Universal Serial Bus (USB).

The digital imaging device and motion detector 10 may also include a processor 222 coupled to the bus 214 via a bus interface 224. In some embodiments, the processor 222 interacts with the imager 204 to adjust image capture characteristics.

The serial bus interface 218 packetizes the captured pixel data and forms frames made up of pixel information including intensity information. The serial bus interface 218 may substitute a bit indicative of the information received, over the bus interface 228, from the infrared motion detector 226. That is, the infrared motion detector 226 may send a signal indicating, in each frame interval, whether or not motion was detected. Conventionally, frames are generated at a frame rate of thirty frames per second for a frame interval of 1/30 second.

If motion is detected, that information may be provided by the processor 222 to the serial bus interface 218 for incorporation within the packetized video data. In one embodiment of the present invention, the least significant bit of the brightness information for at least one pixel of each frame may be removed and replaced by a bit indicative of whether or not motion was detected during the interval of a particular frame.

As a result, the motion information may be transmitted to the processor-based system 14 as part of the ongoing video stream. In the processor-based system 14, a decision may be made, upon detection of the motion bit, as to what action should be taken with the video stream that is being received. In one embodiment of the present invention, if the motion bit indicates motion, the captured video may be stored on the processor-based system 14. If the motion bit indicates no motion, the video may be discarded. Thus, a surveillance or motion activated video storage system may be implemented.

Figure 3:
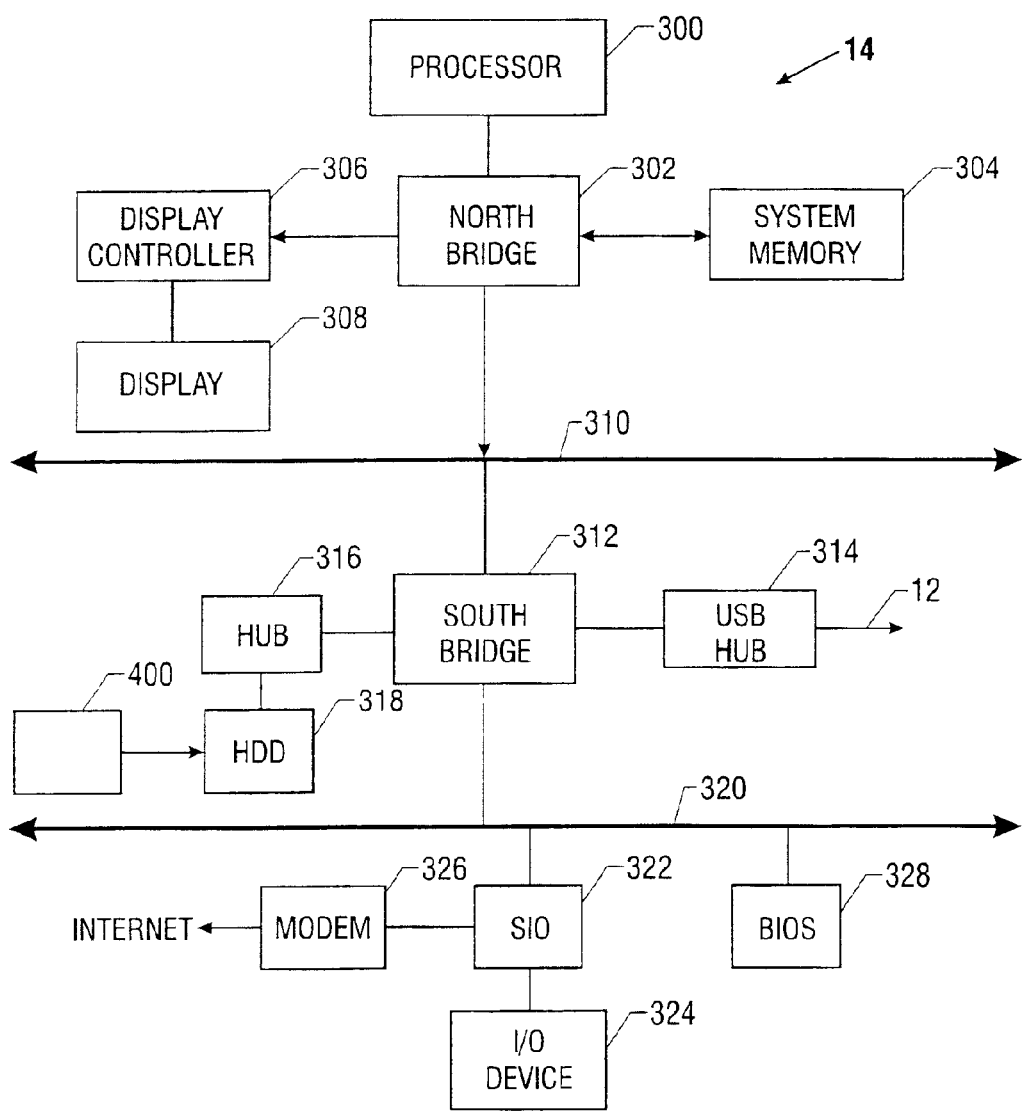
FIG. 3 is a block diagram of a processor-based system coupled to a video capture device in accordance with one embodiment of the present invention.

Referring to FIG. 3, the processor-based system 14 may include a processor 300 coupled to a north bridge 302. The north bridge 302 may be coupled to a display controller 306 and a system memory 304. The display controller 306 may in turn be coupled to a display 308. The display 308 may be a computer monitor, a television screen, or a liquid crystal display, as examples.

The north bridge 302 is also coupled to a bus 310 that is in turn coupled to the south bridge 312. The south bridge 312 may be coupled to a hub 316 that couples a hard disk drive 318. The hard disk drive 318 may store software 400, described hereinafter.

The south bridge 312 may also be coupled to a USB hub 314. The hub 314 in turn is coupled to the serial bus interface 218 of the digital imaging device and motion detector 10.

The south bridge 312 also couples a bus 320 that is connected to a serial input/output (SIO) device 322 and a basic input/output system (BIOS) memory 328. In one embodiment of the present invention, the SIO device 322 is coupled to a modem 326 for Internet access. In this way, the information may be provided from the digital imaging device and motion detector 10 to the processor-based system 14 and ultimately uploaded to the Internet. In addition, the SIO device 322 may be coupled to an input/output device 324 such as a mouse, a keyboard, a touch screen or the like.

Figure 4:
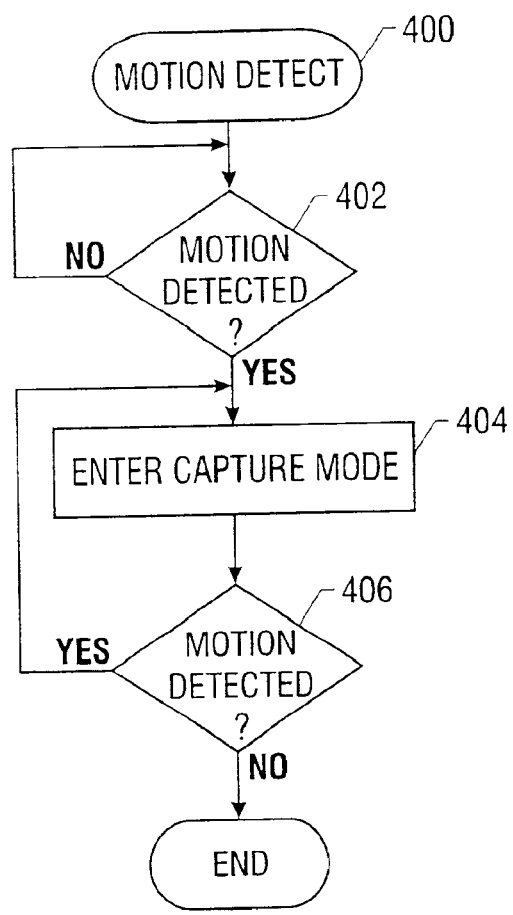
FIG. 4 is a flow chart for a software stored on the processor-based device in accordance with one embodiment of the present invention.

The motion detection software 400, shown in FIG. 4 and stored on the hard disk drive 318 in one embodiment of the present invention, may initially detect whether motion has been identified as indicated in diamond 402. This may be accomplished by depacketizing the packetized frames received from the digital imaging device and motion detector 10. In particular, the bit indicative of motion, that has been incorporated into the video data stream, may be located and detected. If the bit indicates that motion was detected, the system 14 may enter the capture mode as indicated in block 404. In a capture mode, the particular video frame may actually be stored, as one example, on the processor-based system 14, for example on the hard disk drive 318.

After entering the capture mode and storing a particular frame, a check at diamond 406 determines whether motion is still detected. If so, the flow iterates and another frame is captured. Otherwise, the flow ends.

The packetized data from the digital video imaging device and motion detector 10 may be depacketized and displayed line by line on the processor-based system 14. The depacketization may be accomplished by a video driver associated with the processor-based system 14. That driver may be dedicated to handling the video from the device 10. In one embodiment of the present invention, the header for a particular pixel is decoded to obtain the motion bit. In other embodiments, the motion bit may be associated in a variety of packet headers or payload locations for each frame.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving motion detection information from an infrared motion detector;

capturing a digital representation of a scene in an imaging device;

forming in said, imaging device a plurality of packets containing image data and said motion detection information; and transmitting said packets from said imaging device to a processor-based system over a bus.

2. The method of claim 1 including transmitting said packets over a Universal Serial Bus.

3. The method of claim 1 including replacing intensity information in said packet with said motion information.

4. The method of claim 3 including providing a bit in said packet to indicate whether motion was detected.

5. The method of claim 1 including controlling the storage of said digital representation on a processor-based system based on whether motion was detected.

6. The method of claim 1 including replacing image data in one of said packets with said motion detection information.

7. An article comprising a medium storing instructions that, if executed, enable a digital imaging device to:

detect motion within an imaged scene using an infrared motion detector and, in response to the detection of motion, generate motion detection information;

capture a digital representation of a scene in an imaging device using an infrared motion detector;

encode said motion detection information in said digital representation; and transmit said digital representation from said imaging device to a processor-based system over a bus.

8. The article of claim 7 further storing instructions that, if executed, enable the digital imaging device to transmit said digital representation over a Universal Serial Bus.

9. The article of claim 7 further storing instructions that, if executed, enable the digital imaging device to encode said motion detection information in said digital representation in place of image data.

10. The article of claim 9 further storing instructions that, if executed, enable the digital imaging device to replace intensity information in said digital representation with said motion detection information.

11. The article of claim 10 further storing instructions that, if executed, enable the digital imaging device to provide a bit in said digital representation to indicate whether motion was detected.

12. The article of claim 7 further storing instructions that, if executed, enable the digital imaging device to replace image data in one of said packets with said motion detection information.

13. A digital imaging device comprising:

an infrared motion detector;

an imaging element to capture image data representing an image; and a serial bus interface, coupled to said imaging element and said motion detector, said serial bus interface to form a plurality of packets containing said image data for transmission over a bus, serial bus interface to incorporate information about whether motion was detected by said infrared motion detector into said packets containing said image data.

14. The device of claim 13 wherein said serial bus interface is coupled to a Universal Serial Bus.

15. The device of claim 13 including a processor-based device coupled to the bus, said motion detector, serial bus interface and imaging element also coupled to said bus.

16. The device of claim 13 where in said serial bus interface forms said image data into packets including both a payload and a header.

17. The device of claim 16 including intensity information in said packets, said intensity information having a least significant bit.

18. The device of claim 17 including replacing said least significant bit with a bit indicating whether motion was detected by said motion detector.

19. A system comprising:

an infrared motion detector coupled to said imaging device;

a digital imaging device, coupled to said detector, said device including a packetizer that converts image data captured by said imaging device into a plurality of packets and inserts into at least one packet data from said infrared motion detector;

a processor-based device; and a bus coupling said processor-based device and said imaging device.

20. The system of claim 19 wherein said bus is a Universal Serial Bus.

21. The system of claim 19 wherein said packetizer inserts motion data received from said motion detector into packets including said image data.

22. The system of claim 21 wherein said packetizer inserts a bit indicating whether motion was detected into a packet including image data to indicate whether motion was detected in that image data.

* * * * *